Sept. 11, 1962 W. BREITLING 3,054,092

MAGNETIC CORE STORAGE REGISTER

Filed March 17, 1958 9 Sheets-Sheet 1

INVENTOR

Wilhelm Breitling by Michael S. Striker

Attorney

MAGNETIC CORE STORAGE REGISTER

Filed March 17, 1958

INVENTOR
Wilhelm Breitling
by Michael S. Striker
Attorney

Sept. 11, 1962 W. BREITLING 3,054,092

MAGNETIC CORE STORAGE REGISTER

Filed March 17, 1958 9 Sheets-Sheet 3

INVENTOR
Wilhelm Breitling
by Michael S. Striker
Attorney

INVENTOR
Wilhelm Breitling
by Michael S. Striker
Attorney

Sept. 11, 1962 W. BREITLING 3,054,092

MAGNETIC CORE STORAGE REGISTER

Filed March 17, 1958 9 Sheets-Sheet 5

INVENTOR
Wilhelm Breitling
by Michael S. Striker
Attorney

Sept. 11, 1962 W. BREITLING 3,054,092

MAGNETIC CORE STORAGE REGISTER

Filed March 17, 1958

9 Sheets-Sheet 6

INVENTOR
Wilhelm Breitling
by Michael S. Striker
Attorney

Sept. 11, 1962 W. BREITLING 3,054,092

MAGNETIC CORE STORAGE REGISTER

Filed March 17, 1958

9 Sheets-Sheet 7

INVENTOR
Wilhelm Breitling
by
Michael S. Striker
Attorney

Sept. 11, 1962 W. BREITLING 3,054,092

MAGNETIC CORE STORAGE REGISTER

Filed March 17, 1958 9 Sheets-Sheet 8

INVENTOR

Wilhelm Breitling by Michael S. Striker

Attorney

Sept. 11, 1962 W. BREITLING 3,054,092

MAGNETIC CORE STORAGE REGISTER

Filed March 17, 1958 9 Sheets-Sheet 9

INVENTOR

Wilhelm Breitling by Michael S. Striker

Attorney 3,054,092

MAGNETIC CORE STORAGE REGISTER

Wilhelm Breitling, Wilhelmshaven, Germany, assignor to Olympia Werke AG., Wilhelmshaven, Germany Filed Mar. 17, 1958, Ser. No. 721,938

Claims priority, application Germany Mar. 18, 1957

15 Claims. (Cl. 340—174)

The present invention relates to a magnetic core storage register, and more particularly to a register of this type which has a plurality of magnetic register members arranged in a matrix pattern composed of rows and columns thereof.

In registers of the type set forth each of the register members includes a magnetic core member and a set of windings mounted thereon, each winding comprising at least one wire member passing the core member, and each of these sets of windings comprising at least one storage winding, one pick-up winding and one output winding.

As is known an information is stored by magnetizing the core member through an impulse injected into the storage winding, while the information is picked up or released by injecting an impulse through the pick-up winding so as to reverse or otherwise influence the previous magnetization with the effect of delivering the picked up information through the output winding.

In known devices of the type set forth it has been customary to use for the cores a magnetizable material having a characteristical rectangular hysteresis loop for the purpose of enabling only that core member to deliver a substantial impulse (upon receipt of the pick-up impulse) which contains stored information. However, since an ideal rectangular hysteresis loop can hardly be realized in practice, undesired and disturbing impulses appear also in those core members in which no information had been stored so that these stray impulses must be separated from the effective working impulses. This difficulty necessitates the use of separate additional devices. Besides, annular cores that would even approximately answer the condition of having a rectangular hysteresis loop are rather expensive in manufacture.

Therefore, it has been proposed to produce magnetic core storage registers which include cores providing a hysteresis loop other than rectangular. However, in known devices of this type it is still necessary to provide for each element of the register two separate cores with several windings of different directions of turn. Therefore, this type of equipment is also comparatively expensive and involved.

It is, therefore, a main object of this invention to provide a magnet core storage register which would avoid the drawbacks of the known equipment.

It is another object of this invention to provide a register of the type set forth in which it is possible with relatively simple means to keep a stored information stored in the register even after the information has been picked up and released.

A further object of this invention is to provide a register of the type set forth which is comparatively simple in its mechanical and electrical structure and so rugged that reliable service and long life can be expected.

In view of above objects a magnet core storage register according to this invention mainly comprises, in combination, a plurality of magnetic register members arranged in a matrix pattern composed of rows and columns thereof, each of these register members including a magnetic core member and a set of windings mounted thereon, each winding comprising at least one wire member passing said core member, and each of these sets comprising at least one storage winding, one pick-up winding and one output winding. The register further contains a plurality of first diode means respectively connected to each of above storage windings to form a first series-combination; there is also a plurality of second diode means respectively connected to each of above pick-up windings to form a second series-combination. In addition, the register contains a plurality of first switch members respectively associated with each of the rows of the register members, and a plurality of second switch members respectively associated with each of the columns of the register members. Finally, there are circuit means including connections respectively arranged between each of said first switch members and each of said second switch members, one of said series-combinations being connected in each of said connections, so that by simultaneously closing one of the first and one of the second switch members a conductive connection is established across one of the series-combinations appertaining to a register member located at the crossing of that row and column with which the particular first and second switch members simultaneously closed are associated.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Figure 1:
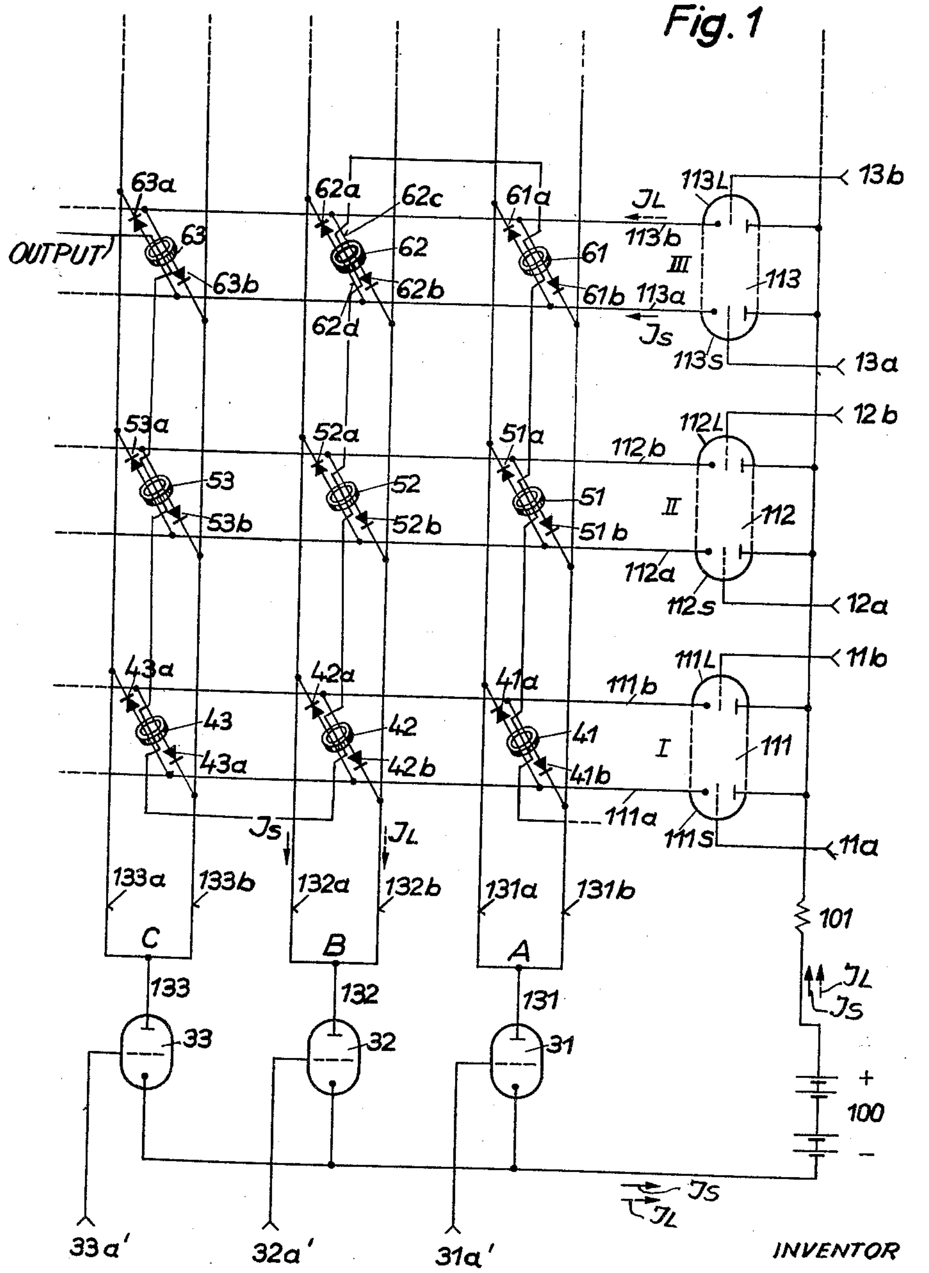
FIG. 1 is a diagrammatic illustration of a portion of a magnet core storage register showing several rows and columns with the pertaining electron tubes.

FIG. 1 shows a portion of a magnet core storage register according to the invention which is equipped with multiple-unit tubes (duo-triodes) 111, 112, 113 etc., associated with the horizontal rows of register elements, and with electron tubes 31, 32, 33 etc. associated with the individual columns of register elements, respectively. The multiple-unit tubes 111, 112, 113 etc. constitute the first switch means while the tubes 31, 32, 33 etc. constitute the second switch means. The first switch means serve to control the injection both of storage and of pick-up impulses. Therefore, the portions 111S, 112S, 113S etc. are connected, respectively, by storage lines 111*a*, 112*a*, 113*a* etc. for carrying the current $J_S$ to the storage windings of the register elements, while the portions 111L, 112L, 113L etc. are connected, respectively, by pick-up lines 111*b*, 112*b*, 113*b* etc. for carrying the pick-up current $J_L$ to the pick-up windings of the same associated register elements in the particular row. Each of the annular cores 41, 42, 43 . . . 51, 52, 53 . . . 61, 62, 63 etc. is provided with one storage winding and one pick-up winding which may consist of one or more turns, but are illustrated, for the sake of simplicity only by a straight line as, for instance, 62*c* and 62*d*, respectively. It is well known that in many cases a straight wire passing through an annular core is equivalent to a winding. Of course, every core is also provided with an output winding which may be connected with each other in the manner conventionally applied to magnet core storage registers. However, in order not to confuse the drawing the output windings are not shown in FIG. 1.

The electron tubes 111, 112, 113 etc. which are associated with the horizontal rows I, II, III etc. are high vacuum tubes which are blocked normally but can be controlled by impressing a voltage on their grids at 11*a*, 12*a*, 13*a* etc. and at 11*b*, 12*b*, 13*b* etc., respectively, in such a manner that, when they are actuated, the potential of a source of D.C. voltage 100 is applied through the thus-opened circuit to the respective storage lines 111*a*, 112*a*, 113*a* etc. and to the respective pick-up lines 111*b*, 112*b*, 113*b* etc., respectively. Simultaneously with the opening of a circuit through the first switch means 111, 112, 113 etc. for the horizontal rows, initiated by controlling means described below, also a circuit is opened across one of the second switch means 31, 32, 33 etc. by impressing a voltage on the respective grids at 31*a'*, 32*a'*, 33*a'* etc., respectively. It can be seen that all the anodes of the first switch means are connected to the positive pole of the battery or source 100 while all the cathodes of the second switch means are connected to the negative pole thereof. If desired, the exact potential applied to the various tubes can be predetermined in conventional manner by means of voltage dividers, parallel or series resistors (for instance, resistor 101) which, however, are not illustrated in detail in order to keep the drawing easily readable.

If, for instance, an information is to be stored in a register as illustrated by FIG. 1, for instance if in the horizontal row III the "word" OLO (which is equivalent to a binary number 010) is to be stored then the potential to the grid terminal 13*a* of the tube 113 and of the grid terminal 32*a'* of the tube 32 must be raised so that circuits across these tubes are opened as follows: plus potential of source 100, resistor 101, portion 113S of the tube 113, storage line 113*a*, storage winding 62*d*, diode 62*a*, column line 132*a*, tube 32, minus potential of the source 100.

It is easy to find from the diagram FIG. 1 that in this stage of the operation all other connections or circuits in the register are blocked by the diodes provided in the various register members. Therefore, the storage current $J_S$ which flows through the above-described circuit influences exclusively the one magnet core 62 magnetically. Therefore, this one core has been emphasized by heavy lines in the diagram.

Obviously, now one element of information has been stored in the register element in row III and in the second column from the right. Assuming that now this information is to be picked up or released from the storage register, then all the pick-up lines must be consecutively placed in circuit, for instance by consecutively raising the potential at the grid terminals 11*b*, 12*b*, 13*b* etc., and by simultaneously opening circuits consecutively through the column lines 131*b*, 132*b*, 133*b*, etc.

It may be mentioned at this point that a direct pick-up impulse can also be directed to selected register elements by actuating correspondingly selected control tubes associated with the particular register element. In such a case the raising of the potential of the respective tube grids can be controlled by an electronic calculating machine or the like.

During the pick-up procedure, all those cores which have been already magnetized by a pick-up impulse (corresponding to Zero value) do not generate in the output winding (not shown) a voltage integral different from zero. Only the core 62 which has been magnetized by the preceding storage of the L-value in the opposite sense, generates an output impulse due to the pick-up current $J_L$ flowing through the pick-up winding 62*c* and the diode 62*b*, and this output impulse can be furnished to, and processed or used by, for instance a calculating machine.

Figure 2:
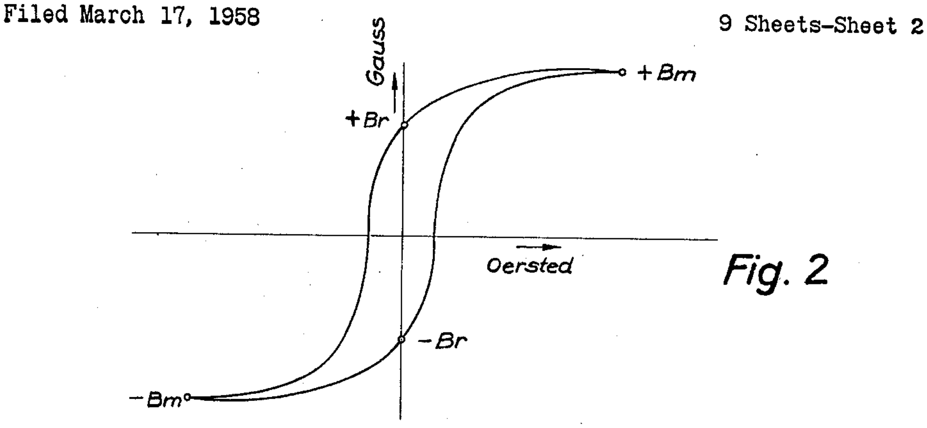
FIG. 2 shows a characteristic hysteresis loop typical of the material to be used for the magnetic core.

It appears advisable to discuss now with reference to FIG. 2 the magnetization process as determined by the characteristic hysteresis loop of the magnet core. As FIG. 2 shows the material in question has not a rectangular loop. The storage current $J_S$ mentioned above magnetizes the core 62. The magnetic condition of the core as it exists before the magnetization is represented by the remanence point $-Br$ of FIG. 2. Now, when a storage current $J_S$ flows the magnetic condition of the core is indicated by the point $+Bm$ and after the cessation of this current by the point of remanence $+Br$. Now an L-value has been stored in the core since it may be assumed for the purpose of this description that the magnetic condition $-Br$ represents the storing of a 0-value, and that the condition $+Br$ represents the storing of an L-value.

As has been mentioned above, the picking up or releasing of stored information requires that the cores have to be reversed magnetically by a pick-up current $J_L$. In those cores in which a 0-value had been stored the magnetic condition changes as shown by the hysteresis loop, by passing from the point $-Br$ via $-Bm$ back to $-Br$. The resulting change of induction, i.e. the time integral of the voltage, is equal to Zero so that the positive and negative values of the relatively small induced voltage in the output winding (not shown) compensate each other. Since, however, this voltage nevertheless amounts to values higher than appear in the case of a core having a rectangular hysteresis loop, a material having a characteristic as shown by FIG. 2 could not be used in storage registers of the known type because the various induced voltages would combine additively in the series-connected output windings of the great number of core members and therefore generate very substantial disturbing impulses. However, in a register according to the invention this cannot occur because the above-mentioned small disturbing voltage or current appears in fact only in the output winding of one single register element at a time.

On the other hand, if in a register element or core to which the pick-up current $J_L$ is applied, had already stored an L-value, then the magnetism is changed as shown by the hysteresis loop by passing from the point $+Br$ via $-Bm$ to $-Br$. The change of induction amounting to $2\times|Br|$ generates in the pick-up winding an effective voltage impulse of substantially greater strength and with a polarity substantially on one side of zero.

If the cores are to be magnetized so as to reverse its magnetism, then, as is known, it is necessary that either the direction of the flow of current or the direction of turn of the winding must be different in the pick-up winding as compared with the storage winding. It has been found that it is advantageous to choose the second possibility because, as FIG. 1 proves, in this case only one of the coordinates (rows or columns) with a full number of switch means or tubes, while the other coordinate requires only half as many switch means or tubes.

Figure 3:
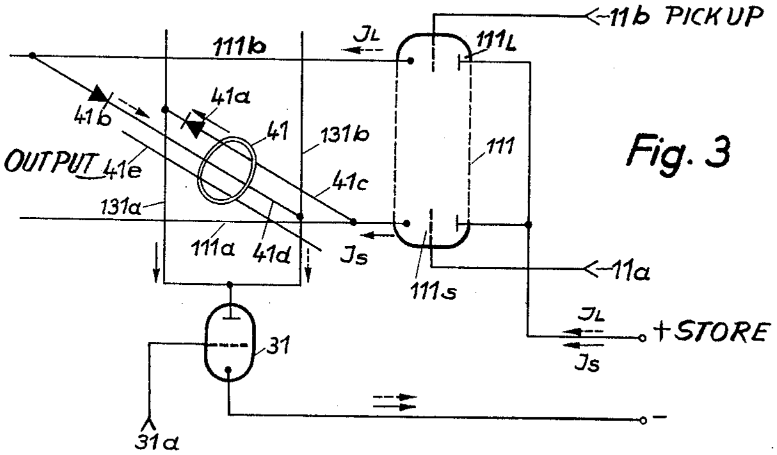
FIG. 3 is a diagrammatic illustration of only one of the register members showing the storage, pick-up and output connections and one example of an arrangement of the pertaining electron tubes.

FIG. 3 will serve to show more in detail the features applying to the individual register elements. As an example, FIG. 3 refers to the magnet core 41 of FIG. 1. In FIG. 3 not only the storage winding 41c passing from the storage line 111a via the diode 41a to the column line 131a, and the pick-up winding 41d connected between the pick-up line 111b, via diode 41b, and the column line 131b, but also an output winding 41e which is understood to be connected in series with the output windings of the other register members. Moreover, it can be seen, that a characteristic feature of this particular embodiment is the fact that in the same manner as in FIG. 1 the tube 111 is a multiple-unit tube having a storage portion 111S and a pick-up portion 111L with separate cathodes which, however, are connected in parallel.

Figure 4:
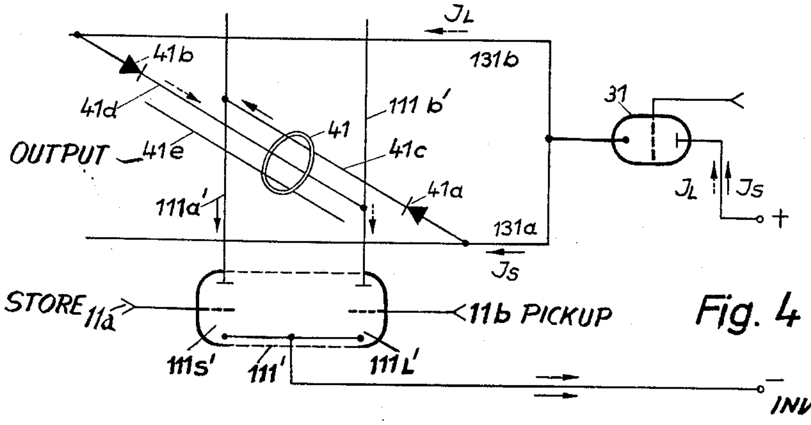
FIG. 4 is a similar diagrammatic illustration showing a different arrangement of the electron tube.

FIG. 4 illustrates a similar arrangement in which, however, the multiple-unit tube 111' is associated with the columns, the column lines 111a' and 111b' being connected with the anodes, respectively, of the tube 111'. In this manner it is possible to use for each column a multiple-unit tube having one cathode common to both portions 111S' and 111L'. Of course, it is also possible to reverse the direction of the flow of current and, under this condition to use the tube 111 in the same circuit system for controlling the rows and to use the tube 31 for controlling the column lines.

It should be understood that instead of the control tubes other electromechanic switch means or transistors could be used with the same effect. In the case of the transistors the connections thereof must be provided in accordance with well known rules in such a manner that the transistors would function with respect to the storage and pick-up windings, respectively, in the same manner as the above-described tubes.

The control or actuation of a storage register according to the invention can be carried out in various ways, depending upon the way in which it is desired to apply the output of the register to other devices. If, for instance, the "word" OLO is available in the form of a sequence of impulses representing the information to be stored, then in the register the grid potential of the tube associated with the particular row of register elements must be raised either during the entire time required for transmitting all the impulses representing the particular "word", or it must be raised periodically in step with the frequency of the pulses representing the information. In the second case, timed pulses in equal intervals can be generated in a well known manner separately but with the same frequency as the pulses representing the information, and the timed pulses may then be applied to the grids of the particular group of tubes associated with one particular row. On the other hand, a control voltage is applied to the grids of the tubes associated with the columns in a sequence corresponding to the pattern of the information.

Figure 5:
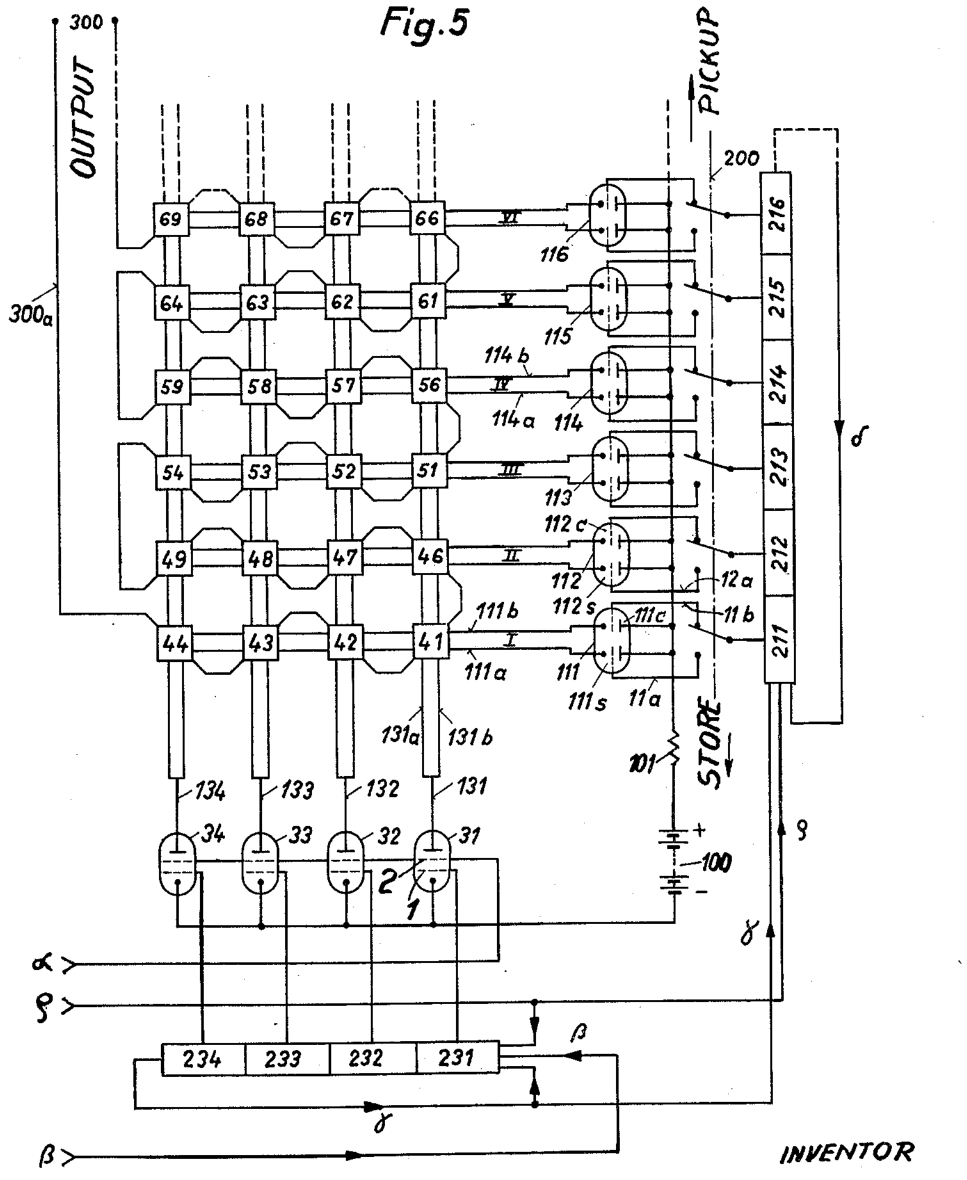
FIG. 5 is a diagram illustrating an embodiment of the invention including a stepwise operating register for injecting information in form of a sequence of impulses representing binary digits.

As can be seen from FIG. 5, the various tubes associated with the columns of register elements, and if desired also the various tubes associated with the rows thereof, can be actuated sequentially by means of electronic, stepwise operating registers 231–234 and 211–216, respectively. In this particular embodiment the magnet core storage register is supposed to be used for storing, in proper order positions, binary numbers by storing consecutive rows 4-unit binary numbers injected in the form of impulse sequences. In this case, the storage operation develops as follows:

Timed pulses $s$ furnished by a separate timed impulse generator, not shown, actuate the register 231–234, starting with the element 231 and proceeding step-by-step to the element 234. Every one of these elements, when actuated, raises the potential of the associated and connected grid of the respective tubes 31–34 and thereby prepares the opening of a circuit through the particular tube. It should be understood that the just-mentioned potential is a preparatory voltage lower than that required for opening the circuit across the tube. However, as soon as an impulse appears in the input $\alpha$ of the second grid control line, all the second grids, connected in parallel, of the tubes 31–34 are supplied with additional voltage so that, in the presence of the preparatory voltage on the first grid of a particular tube, this tube is caused to open the circuit between the negative pole of the source 100 and the column line 131–134, respectively, whichever line is connected to the anode of the particular tube. During the first cycle of operation of the counting register 231–234, the first element 211 of the other counting register 211–216 is operative and raises the potential of the grid in the tube portion 111S provided that the multi-lever changeover switch 200 is in the position "store"; by raising said grid potential the positive pole of the source 100 is connected with the storage line 111a of the row I which corresponds to the first order of the binary number. Consequently, the first sequence of impulses arriving at $\alpha$ is stored in all the cores 41–44.

After completion of a cycle of operation of the counting register 231–234 the element 234 transmits a re-starting impulse $\gamma$ to the first element 231 whereby the starting condition of the register is reestablished. Simultaneously the impulse $\gamma$ is transmitted also to the counting register 211–216 and causes the latter to shift one step to element 212. Consequently, during the second operational cycle of the counting register 231–234 the second sequence of impulses appearing at $\alpha$ and representing the next portion of the information is stored in the register elements 46–49 in row II. After in this manner all the orders I–VI etc. have been stored finally a re-starting impulse $\delta$ is transmitted to the element 211 and thereby reestablishes the starting condition of the counting register 211–216.

Whenever the stored value or information is to be picked up or released from the register, e.g. in order to utilize it for further calculations in an electronic calculator, the multiple switch 200 (which, of course, could also be an electronic switch means) must be moved into its position "pick-up." Now the pick-up procedure develops in exactly the same manner as the storage procedure described above, the counting register 231–234 again functioning in such a manner that a sequence of impulses is injected, respectively, into the various tubes 31–34, and that after every complete operational cycle the second counting register 211–216 is caused to shift one step. Therefore, the binary number stored in the register elements 41–44 appears as a sequence of impulses at the output terminals 300, and after that the other sequences of impulses follow which represent the other binary numbers corresponding to the orders II–VI etc.

Figure 7:
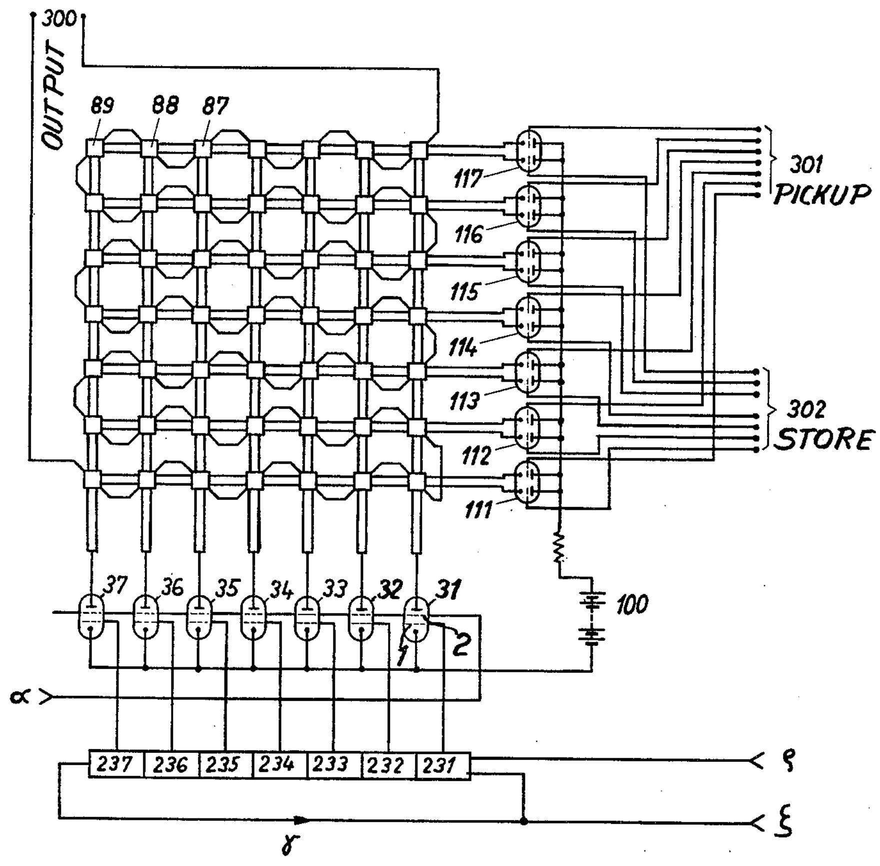
FIG. 7 is a diagram illustrating another embodiment of the invention in which control impulses are injected into the columns of register members by a stepwise operating register, while the selection of the rows is obtained by a control mechanism or circuit separate from the register.

The embodiment illustrated by FIG. 7 represents another possibility of controlling a "word storage register" containing any desired number of rows and columns. In this embodiment only the columns of the storage register are controlled by a counting register 231–237 in the above described manner. However, the rows of the register are controlled and selected by a separate control device or mechanism of the type known for instance in electronic calculating machines. In this manner at a given moment one of the connections 302 is selected by the control mechanism (not shown) to inject an impulse for the purpose of storing an element of information. At the same time a starting impulse $\xi$ is applied to the input end of the counting register and starts the latter simultaneously and jointly with the timed impulses $s$. Impulse sequences arriving at $\alpha$ as elements of information are therefore stored in this manner in those rows of the register which have been selected by the separate control mechanism. In a similar manner the selection of the proper rows is done during the pick-up procedure by the control mechanism which selects the proper one of the connections 301 while the counting register 231–237 injects impulses step by step into the respective columns so that the individual register elements of each selected row are consecutively furnished with a pick-up impulse.

Of course it is also possible to carry out the selective control of the various columns by means of a control mechanism instead of by said counting register in which case the individual columns are selected depending upon the calculating operations of an electronic calculating machine in the same manner as the selection of the various rows of elements is carried out in accordance with the example just described.

Should the binary numbers that are to be stored not be available in the form of sequencies of impulses but have to be derived for instance from a punched tape or the like, then the parallel connection between the grids 2 of the tubes 31–34 (FIG. 5) has to be omitted and the impulses corresponding to the individual orders of the binary number are simultaneously also applied to these grids. However also in this case the storage procedure is effected in the same manner as before during an operational cycle of the counting register 231–234.

Figure 6:
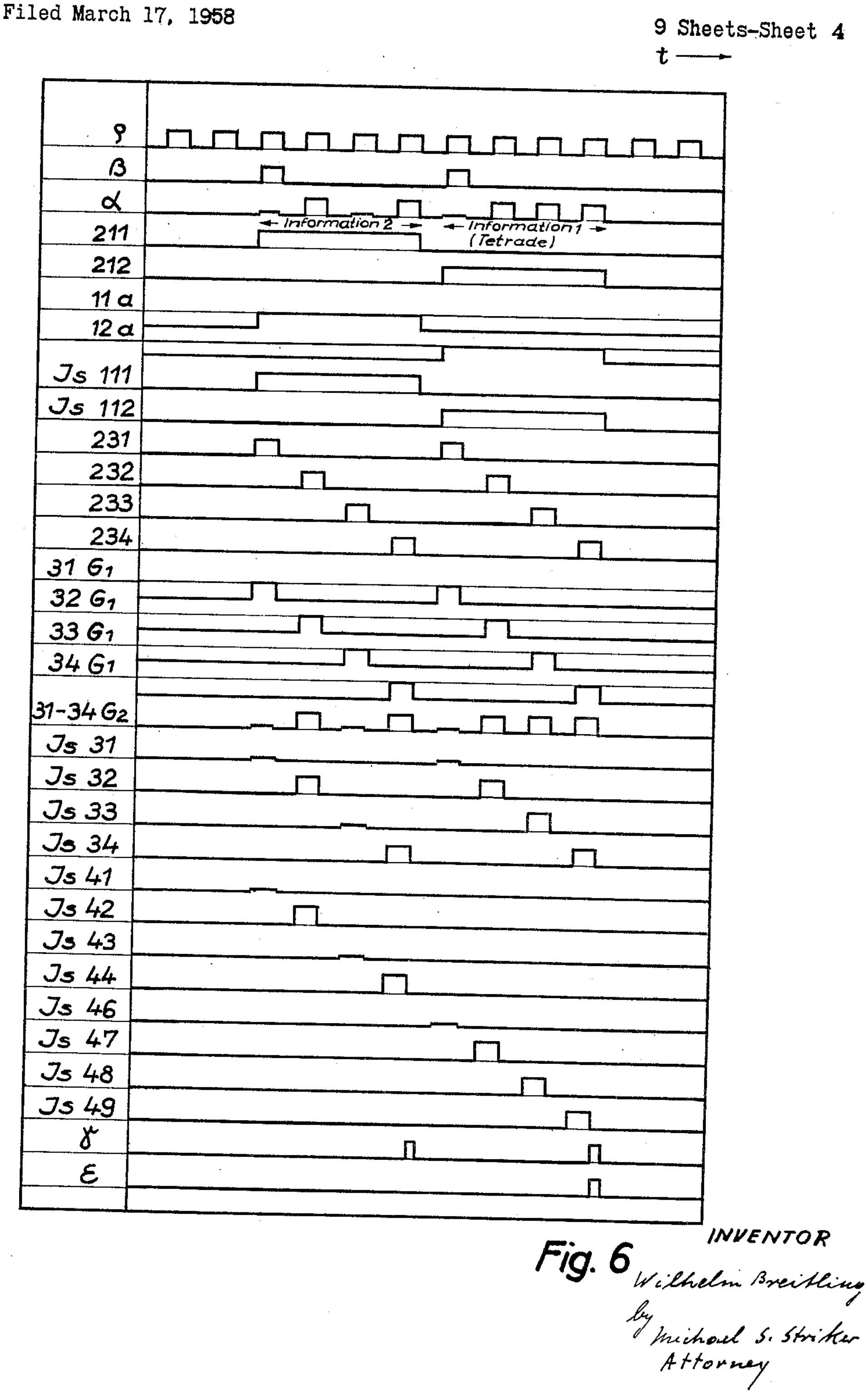
FIG. 6 is a time diagram illustrating the operation of a register according to FIG. 5.

In order to illustrate more clearly the sequence of operations of an embodiment according to FIG. 5 during the storing of information appearing as a sequence of impulses, FIG. 6 is a time diagram concerning the case that for instance a decimal number 24 represented by binary numbers selected according to the so-called "3-Excess-Code." As can be seen from the first row at the top of the diagram, a continuous sequence of evenly spaced timed pulses $s$ forms a basic element. As soon as a starting impulse $\beta$ is injected, while both counting registers are in starting condition (both register elements 231 and 211 being in open condition), for instance by the control mechanism of an electronic calculating machine, the counting register 231–234 starts to operate stepwise in time coincidence with the frequency of the timed impulses $s$ and to shift step by step from element to element until the last element 234 is reached. During this sequence one element of this register after the other raises the potential of the grids 1, respectively of the various tubes 31–34 which are associated with the respective columns. Since the calculating machine furnishes, simultaneously with the starting impulse $\beta$, a sequence of impulses OLOL, corresponding to a binary number representing the decimal digit 2, to the input line $\alpha$ and thereby to the grids 2 connected in parallel and forming part of the respective tubes 31–34, the circuits through those tubes are consecutively opened, to the grids of which simultaneously a second potential is applied from the elements of the counting register 231–234. As can be seen further from the time diagram this phenomenon occurs in the tubes 32 and 34 which, therefore, store the L-values of the information in the register elements 42 and 44 because the circuit through the tube portion 111S is open. At the end of the storing operation the impulse $\gamma$ causes the counting register 231–234 to return to its starting condition and at the same time causes the counting register 211–216 to shift one step to the element 212. With the next, second starting impulse $\beta$ a new operational cycle of the counting register 231–234 is started which has the effect as the diagram shows, of storing the L-values of the impulse sequence OLLL representing the decimal digit 4 in the register elements 47, 48 and 49.

As has been stated at the outset, it is a further object of this invention to provide a storage register capable of re-storing an element of information after it has been picked up and released. The known types of magnet core storage registers operate in such a manner that the stored information is completely eliminated from the register as soon at it has been picked up and released, which in most cases constitutes a severe disadvantage. Whenever it has been found desirable to have the information further available after the pick-up procedure, the known equipment made it necessary to transfer such information simultaneously with the pick-up procedure to an auxiliary storage register or similar device where this information then remained available for further use even after the completion of the pick-up procedure. It is evident that this method requires substantial additional equipment and in certain cases may even cause time losses. In contrast therewith the storage register according to the invention makes it possible to provide for re-storing the picked up information with comparatively simple means.

Figure 8:
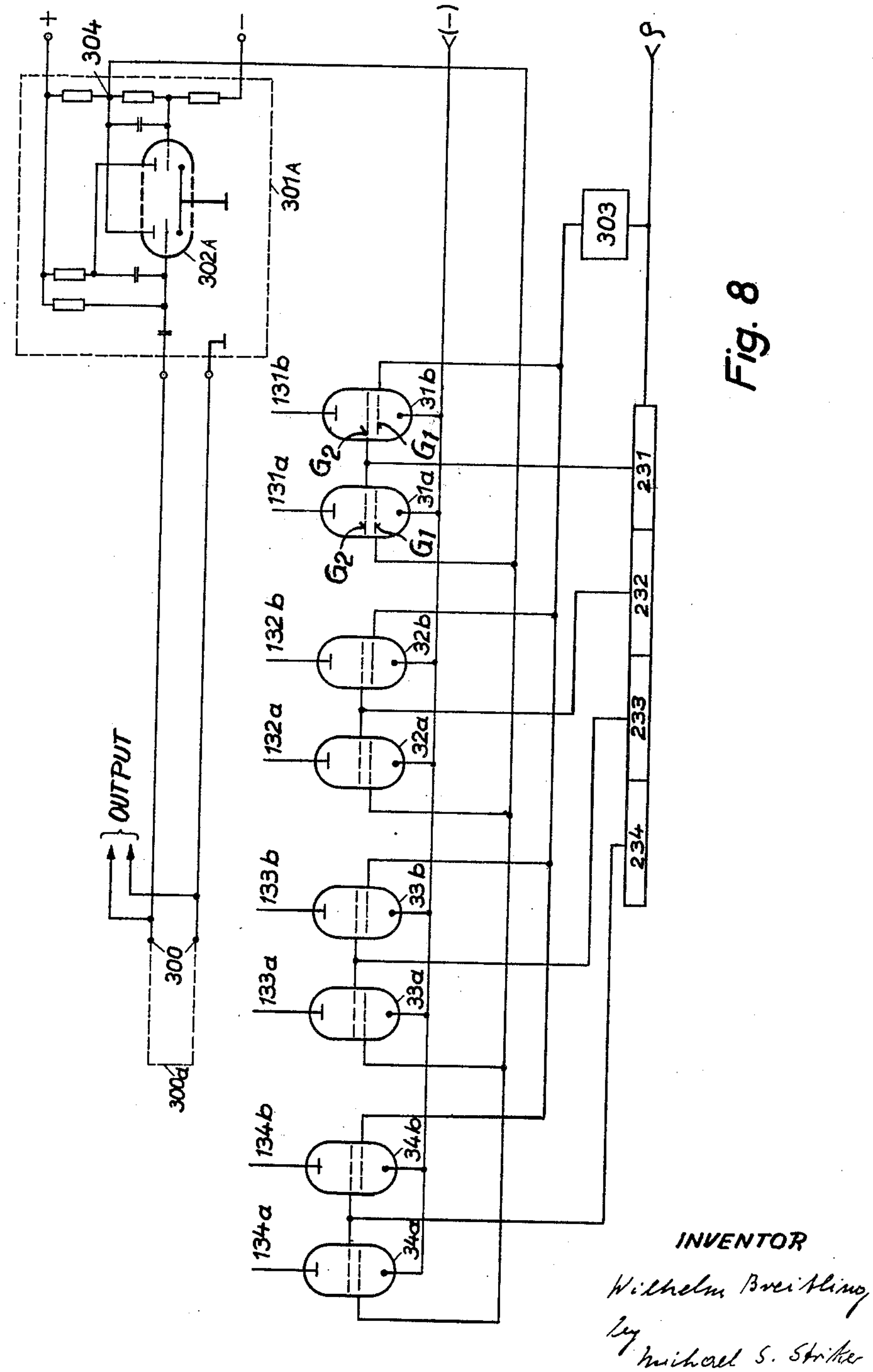
FIG. 8 is a diagram illustrating a portion of a register according to the invention provided with means for restoring an information automatically after the same information has been picked up and released.

FIG. 8 illustrates accordingly a modification of that portion of the arrangement shown in FIG. 5 which serves to control the columns of register elements. In this case one tube having two control grids $G_2$ and $G_1$ is associated with, and connected to, each column line 131*a*, 131*b*, 132*a*, 132*b* . . . etc. The grids $G_2$ of the two tubes of each particular column, e.g. tubes 31*a* and 32*b*, are connected in parallel and the junction point between the two grids is connected to a corresponding element of the counting register 231–234. All the grids $G_2$ are provided normally with a negative bias potential and are consecutively furnished with an impulse by the counting register in step with the timed impulses $s$ and thereby provided with a positive potential. In this manner a preparatory grid potential is applied at the proper moment and in the proper intervals to one of the pairs of tubes 31*a*/31*b*, 32*a*/32*b*, etc. after the other. The grids $G_1$ of the tubes 31*b*, 32*b*, 33*b*, and 34*b* which control the pick-up windings in the register, are connected in parallel and are supplied with a positive control impulse also by the timed impulses $s$. In a similar manner all the grids $G_1$ of the tubes 31*a*, 32*a*, 33*a* and 34*a* are connected in parallel and are supplied with a control potential by a delaying device 301A which may be a "Univibrator" connected with one input terminal, and ground, to the output terminals 300 of the storage register (see also FIG. 5).

Figure 9:
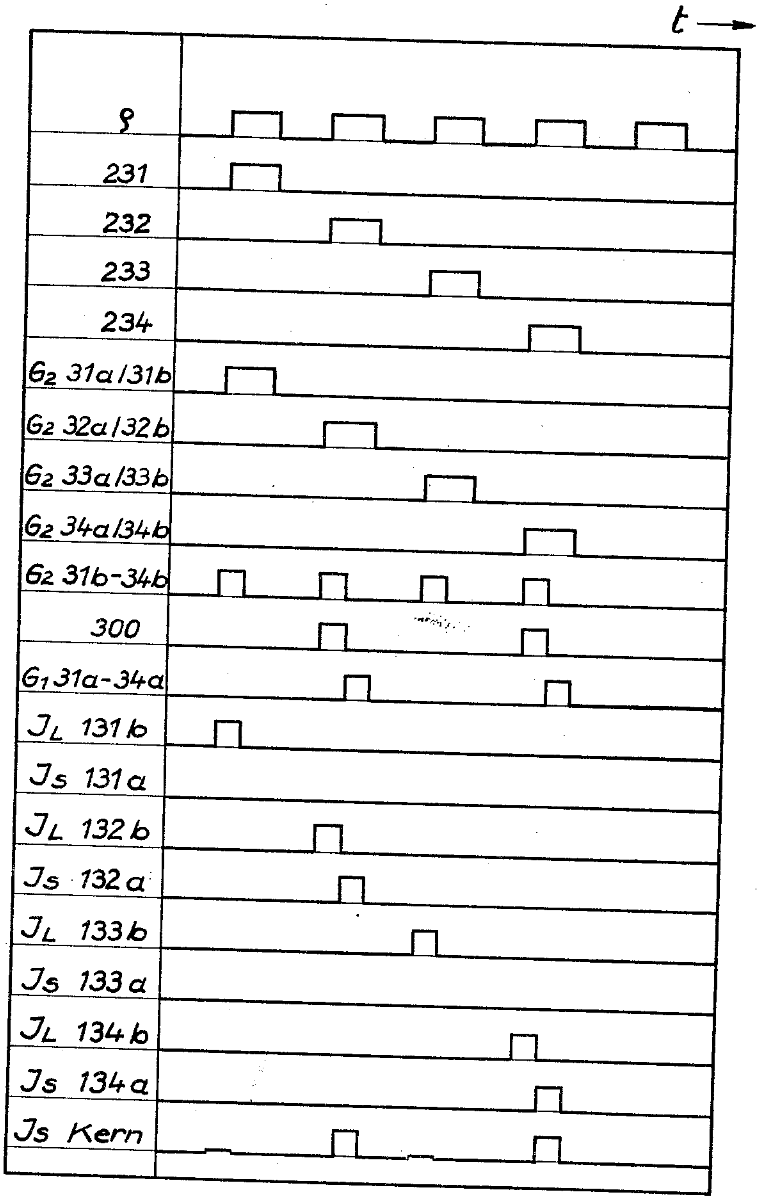
FIG. 9 is a time diagram illustrating the operation of a register according to FIG. 7.

The time diagram FIG. 9 illustrates in which manner and sequence the potentials of the various grids vary with time. In this example again the decimal digit 2 in the corresponding binary form OLOL is chosen as the element of information to be picked up from the register and immediately thereafter to be re-stored therein. Upon the first timed impulse $s$ the first element 231 of the counting register feeds an impulse to the grids $G_2$ of the tubes 31*a* and 31*b*. Simultaneously, actually during the first half of the timed impulses $s$, an impulse is supplied to all the grids $G_1$ of the tubes 31*b*, 32*b*, 33*b* and 34*b*. For this purpose the timed impulses $s$ must be shortened to approximately half the duration of the basic impulse which can be effected by means of a conventional auxiliary device 303, for instance a differentiating device with a series-connected monostable flip-flop device. Since, however, only the tubes 31*a* and 31*b* have been supplied with a preparatory grid voltage appearing on their grids $G_2$, only the tube 31*b* controlling pick-up windings in the column associated therewith is caused to open the corresponding circuit. The current $J_L$ flowing in the column line 131*b* magnetizes the magnet core 41 as has been described in reference to FIGS. 1 and 5. Since in this case a Zero was stored in the core 41 no pick-up voltage would appear in the output coil 300*a* so that no exciting impulse is injected into the delaying device 301 connected to the output terminals 300. However, upon the next following timed impulse $s$ the tubes 32*a* and 32*b* obtain a preparatory grid voltage, but only the circuit across the tube 32*b* is open by the timed impulse. Now the pick-up current $J_L$ applied to the pick-up winding of the register element 42 generates a pick-up voltage at the output terminals 300 because an L-value has been stored previously in that particular register element 42. The resulting impulse injected into the delay device 301A causes the emission of a delayed impulse therefrom and into the grid $G_1$ of the tubes 32a, 33a, 34a. However, since in this case only the tubes 32a and 32b have obtained a preparatory grid voltage, only the storage controlling tube 32a is caused to open the circuit thereacross, and the resulting storage current $J_S$ magnetizes the core 42 so that again an L-value is stored before the next following timed impulse s causes the counting register 231–234 to shift one step to the element 233. The effect of the third timed impulse s corresponds exactly to that of the first timed impulse because also in the third register element 43 of the row I a 0-value had been stored. In turn, the effect of the fourth timed impulse s corresponds to that occurring at the time of the second impulse and described above. Consequently, the storage register has stored the same information again which had been stored therein before this information has been picked up and released.

It should be understood that the delaying device 301 may consist of any other suitable delaying means instead of the univibrator with a duo-triode 302 as shown but not described in detail because it is known per se.

Figure 10:
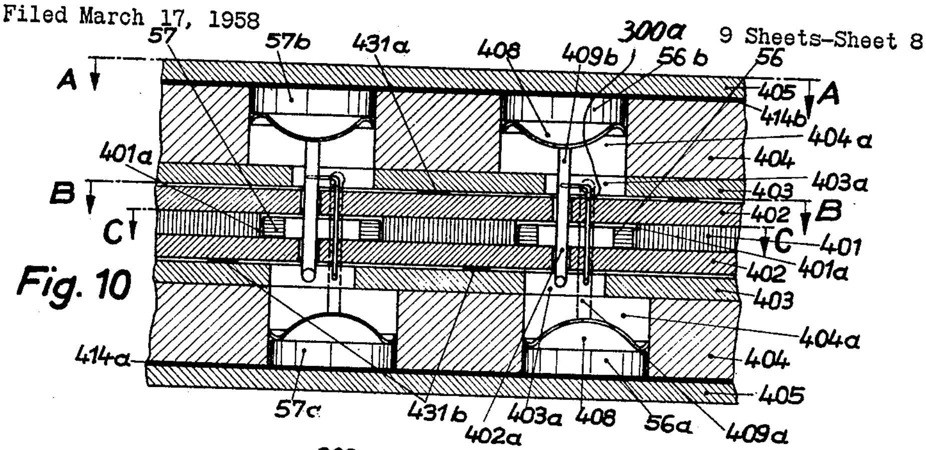
FIG. 10 is a cross-sectional view of one embodiment of the invention illustrating one example of its structural construction.
Figure 11:
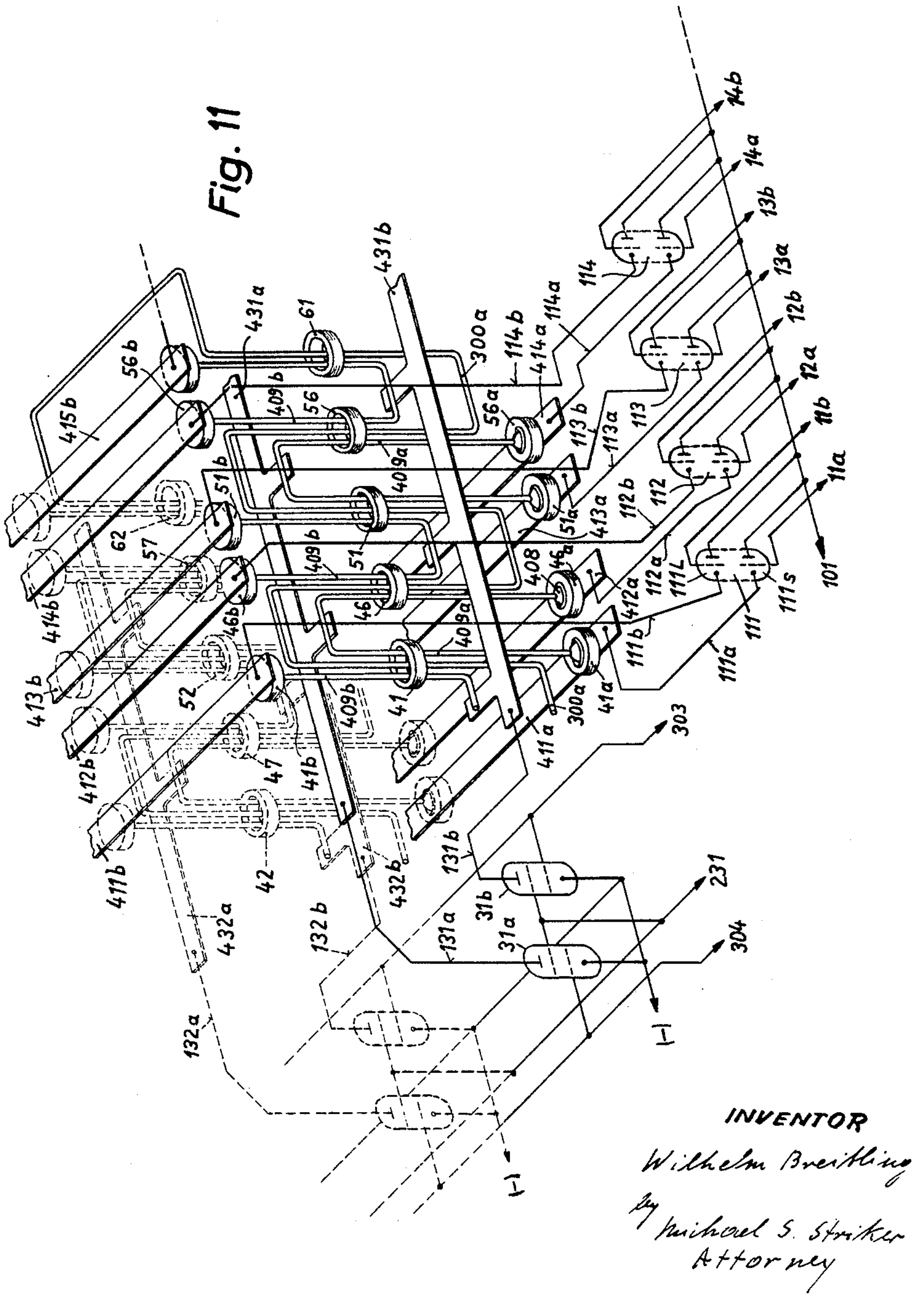
FIG. 11 is a perspective pictorial illustration of a register according to FIG. 10, some elements shown only diagrammatically and certain portions omitted in order not to obscure other parts.

Finally, in accordance with a further object of the invention, a particularly simple structural form of the storage register is illustrated by FIGS. 10–11. One important feature of this construction is the use of circuit means comprising conductive surface elements ranged on an insulated supporting plate. Circuit means of this type are generally known as "printed circuits" although this term should not be interpreted too literally since equivalent circuit means are for instance produced by etching or other equivalent processes.

Figure 10A:
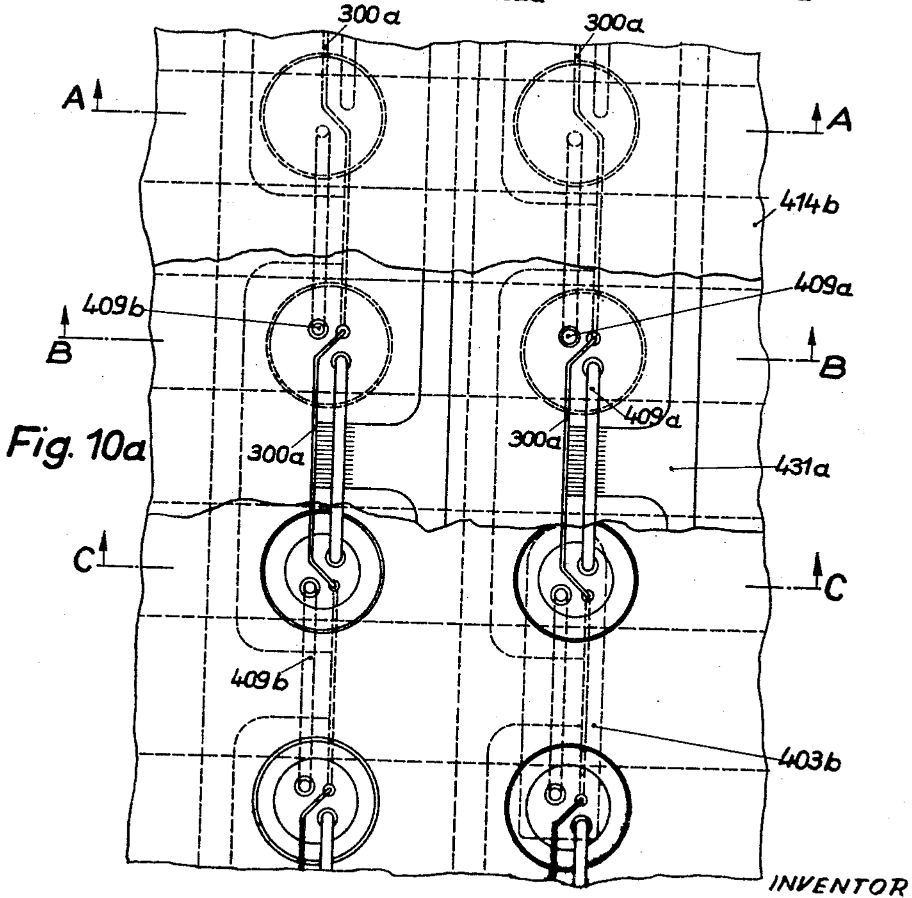
FIG. 10*a* is a corresponding plan view taken in several levels of the structure illustrated by FIG. 10.

FIG. 10 illustrates a preferred embodiment in a multiplane cross-sectional view, the various portions thereof being taken along lines A—A, B—B and C—C of FIG. 10a. On the other hand, FIG. 10a is a multi-plane plan view showing portions of the structure in plan views taken in the planes A—A, B—B and C—C, respectively, of FIG. 10.

A plate of insulating material 401 is provided with openings or perforations 401a in order to accommodate the annular cores 56, 57, etc. This plate 401 is covered on both sides by auxiliary insulating plates 402 which are provided with perforations permitting to pass the wires 409a and 409b therethrough. These wires are bent to a U-shape and are attached with one end, respectively, to conductive strips 431a, 431b, etc., for instance by soldering, said strips being preferably conductive surface elements provided on the insulating plates 302 by the printed circuit method as explained above. The strips 431a and 431b are in turn connected to the column lines or wires 131a and 131b shown in FIG. 5. Further insulating plates 403 are superimposed over the insulating plates 402 and also provided with openings or cutouts 403a and 403b. The wires 409a, 409b, respectively, which have U-shape, have their soldered connection with the strips 431a, 431b, respectively, located in these cutouts. Still further insulating plates 404 are superimposed over the plates 403 and are provided with openings 404a for accommodating the diode members (rectifier tablets) 56a, 56b, 57a, 57b, etc., and resilient end contacts 408 mounted on the second end of the above mentioned wires 409a, 409b, etc. The circuits which include said diodes comprise conductive strips 414a, 414b (see also 411a, 411b, 412a, 412b, etc. in FIG. 11) arranged on further insulating plates 405 which may also be produced according to the printed circuit method. The conductive strips 414a and 414b are connected with the lines or wires 114a and 114b as shown in FIG. 5, and in a similar manner connections are made between the lines 411a and 111a, 411b and 111b, etc.

The wire which constitutes the output coil 300a extends through corresponding perforations of the insulating plates 402 and through the cutouts 403a, 403b, respectively, etc.

In accordance with above described srtucture the following circuits exist as illustrated by FIG. 11: for instance from the cathode of the portion 111S of the tube 111 via wire 111a, strip 411a, diode 41a, wire 409a, strip 431a, column line 131a to the anode of the corresponding tube 31a (see FIG. 8). A similar circuit exists also in the opposite direction, i.e. from the cathode of the portion 111L of the tube 111 via the wire 111b, the strip 411b, the diode 41b, the pertaining leg of the bent wire 409b, the strip 431b, the column wire 131b to the anode of the corresponding tube 31b (see FIG. 8). Analogous circuits exist in the remaining parts of the structure and can be followed easily if one starts from the tubes 112, 113, 114, etc.

FIG. 11 also shows very clearly in what manner the output coil 300a (see also FIG. 5), i.e. the total series-connection of all the output windings of all the register elements, is threaded in zig-zag fashion through the various magnet cores of the whole storage register.

It will be understood that each of the elements described above, or two or more together, may also find a useful application in other types of magnetic core storage registers differing from the types described above.

While the invention has been illustrated and described as embodied in a magnetic core storage register with members arranged in a matrix pattern, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a matrix type storage register including a plurality of magnetizable cores arranged in rows and columns, each core having at least one winding thereon, in combination, first circuit means including a plurality of row connections and first switch means connected therewith and respectively associated with the individual rows of cores for applying magnetizing pulses thereto; second circuit means including a plurality of column connections and second switch means connected therewith and respectively associated with the individual columns of cores; a plurality of diode means of which each is connected individually with a different one of said windings to form therewith a series-combination associated only with the particular core carrying the respective winding and permitting passage of pulses only in a direction causing magnetization of only the respective core with one predetermined polarity, each of said series-combinations being connected respectively between the particular row connection and column connection associated with the particular core according to the row and column position of the latter, whereby upon simultaneous closing of a first and a second switch means a pulse carrying circuit is established between said switch means across the series-combination of only that core which is located at the crossing of the row and column with which the first and second switch means simultaneously closed are associated.

2. In a magnetic core storage register, in combination, a plurality of magnetic register members arranged in a matrix pattern composed of rows and columns thereof, each of said register members including a magnetic core member and means for changing the condition of said core member between a stable state of magnetization of one polarity and a stable state of magnetization of opposite polarity, said means including a set of windings mounted thereon, each winding comprising at least one wire member passing said core member, and each of said sets comprising at least one storage winding, one pick-up winding, and one output winding; a plurality of first switch members respectively associated with each of said rows of said register members; a plurality of second switch members respectively associated with each of said columns of said register members; first circuit means comprising a plurality of paired first and second row connections respectively connected with said first switch members for carrying storage and pick-up pulses, respectively, upon actuation of the respective first switch member; second circuit means comprising a plurality of paired first and second column connections respectively connected with said second switch members for carrying storage and pick-up pulses, respectively, upon actuation of the respective second switch member; a plurality of first diode means of which each is connected individually to a different one of said storage windings to form therewith a corresponding first series-combinations associated only with the particular core carrying the respective winding and permitting storage pulse passage causing magnetization of only the respective core with one predetermined polarity, each of said first series-combinations being connected between the respective first row connection and the respective first column connection associated with the particular register member according to its row and column position; a plurality of second diode means of which each is connected individually to a different one of said pick-up windings to form therewith a corresponding second series-combinations associated only with the particular core carrying the respective winding and permitting pick-up pulse passage causing magnetization of only the respective core with opposite polarity, each of said second series-combinations being connected between the respective second row connection and the respective second column connection associated with the particular register member according to its row and column position; and third circuit means connecting said output windings of a plurality of said register members for delivering output pulses when a storage magnetization of a register member is reversed by application of a pick-up pulse thereto so as to create an output pulse, whereby upon simultaneous actuation and closing of one of said first switch members and one of said second switch members a conductive connection for the application of storage and pick-up pulses is established across only one of said series-combinations, respectively, appertaining to a register member located at the crossing of that row and that column with which the particular first and second switch members simultaneously closed are associated.

3. In a matrix type storage register, in combination, a plurality of pulse inputs; a plurality of pulse input switch means corresponding in number to that of said inputs and each connected to a different one of said inputs; a plurality of pulse outputs; a plurality of pulse output switch means each connected to a different one of said outputs; a plurality of sets of magnetizable cores, each of said cores having at least one winding thereon, rectifier means being respectively connected with each of said windings so as to form a series-combination associated with the particular core, one end of each series-combination within each set of cores being jointly connected to a different one of said pulse input switch means respectively associated with the particular set of cores, and the other end, respectively, of series-combinations associated with selected single cores belonging to different sets of cores and forming a group of cores, being jointly connected with a different one of said pulse output switch means respectively associated with said groups of cores; source means connected between all of said pulse input switch means and all of said pulse output switch means for applying a pulse to selected core means by way of a selected series-combination determined by a selected one of said pulse input switch means and a selected one of said pulse output switch means respectively connected with the selected series-combination and simultaneously changed between open and closed conditions; and means for simultaneously changing said conditions of selectable combinations of any one of said pulse input switch means and any one of said output switch means.

4. A magnetic core storage register as set forth in claim 2, wherein said paired first and second row connections of each row are respectively connected with separate ones of said first switch members, while said paired first and second column connections of each column are connected respectively with one common one of said second switch members.

5. A magnetic core storage register as set forth in claim 2 wherein said paired first and second row connections of each row are respectively connected with one common one of said first switch members, while said paired first and second column connections of each column are respectively connected with separate ones of said second switch members.

6. A magnetic core storage register as set forth in claim 2, wherein said switch members are electronic control means capable of opening a circuit to a flow of direct current when said control means is subjected to a control potential.

7. A magnetic core storage register as set forth in claim 2, wherein said second switch members are electron tubes having two control grids one of which is adapted to be supplied with a preparatory potential lower than the one required to open a circuit through said tube, while the other grid is adapted to be supplied with an actuating potential sufficient to open said circuit in presence of said preparatory potential; in each of said column of register members the output ends of said first series-combinations being connected jointly to the anode of one of said electron tubes, the output ends of said second series-combinations being jointly connected to the anode of another one of said electron tubes; and said other grids of said two tubes being connected in parallel for simultaneous activation; a step-wise operating counting register being connected with its individual element outputs respectively with parallel connected other grids of said two tubes of individual columns for furnishing said preparatory potential to said second switch members as impulses in a predetermined timed sequence; timing means capable of furnishing second impulses substantially coinciding with said first mentioned impulses, but lasting only substantially half of their period, said timing means being connected jointly to said one grid of said other tube respectively of each of said columns of register members; a delay device having an input and an output terminal and capable of furnishing a delayed impulse after having received an impulse, said input terminal being connected to the common output of said output windings of said register members, while said output terminal is connected jointly to said one grid of said one tube respectively of each of said columns of register members; and the cathodes of all said electron tubes being connected to a source of negative potential; whereby an impulse appearing in the output winding of any one of said register members after actuation of any one of said other electron tubes for injecting a pick-up impulse into the pick-up winding of the particular register member results in a delayed impulse from said delaying device into the other electron tube of the column in which the particular register member is located so that the information that has been picked up is immediately thereafter stored again in the same register member.

8. A magnetic core storage register as set forth in claim 2, including a plurality of layers of insulating plates provided with recesses and openings for accommodating said magnet core members, said diode means and said circuit means, said storage windings and pick-up windings being wire means including resilient end portions adapted to conductively contact the associated diode means, said circuit means being conductive surface elements integral with some of said insulating plates, the ends of said wire means opposite to said end portions being permanently and conductively attached to said surface elements.

9. A magnetic core storage register as set forth in claim 8 wherein said output windings consist substantially of one continuous wire means passing in zig-zag fashion consecutively through all said magnet core members and through said recesses and openings.

10. A magnetic core storage register as set forth in claim 4, wherein in each of said rows of register members all of said first series-combinations are connected in parallel at their respective input ends with one of said first switch members, and all of said second series-combinations are connected in parallel at their respective input ends with another one of said first switch members, while in each column of said register members the output ends of all of said first and second series-combinations are connected in parallel with each other to form a parallel-combination, and this parallel-combination is connected to said common one of said second switch members.

11. A magnetic core storage register as set forth in claim 5 wherein in each of said columns of register members all of said first series-combinations are connected in parallel at their respective output ends with one of said second switch members, and all of said second series-combinations are connected in parallel at their respective output ends with another one of said second switch members, while in each row of said register members the input ends of all of said first and second series-combinations are connected in parallel with each other to form a parallel-combination, and this parallel-combination is connected to said common one of said first switch members.

12. A magnetic core storage register as set forth in claim 4, wherein said one common one of said second switch members is an electron tube having two control grids, one of which is adapted to be supplied with a preparatory potential lower than the one required to open the circuit through said tube, while the other grid is adapted to be supplied with an actuating potential sufficient to open said circuit in presence of said preparatory potential, a source of energy being connected to said other grid for furnishing said actuating potential as impulses representing the information to be stored.

13. A magnetic core storage register as set forth in claim 12 wherein a stepwise operating counting register is connected with its individual element outputs respectively with said one grid of the electron tubes serving as said second switch members, for furnishing said preparatory potential in a predetermined sequence.

14. A magnetic core storage register as set forth in claim 5 wherein said one common one of said first switch members is an electron tube having two control grids, one of which is adapted to be supplied with a preparatory potential lower than the one required to open the circuit through said tube, while the other grid is adapted to be supplied with an actuating potential sufficient to open said circuit in presence of said preparatory potential, a source of energy being connected to said other grid for furnishing said actuating potential as impulses representing the information to be stored.

15. A magnetic core storage register as set forth in claim 14 wherein a stepwise operating counting register is connected with its individual element outputs respectively with said one grid of the electron tubes serving as said first switch members, for furnishing said preparatory potential in a predetermined sequence.

References Cited in the file of this patent

UNITED STATES PATENTS

| | | |
|---|---|---|
| 2,734,184 | Rajchman | Feb. 7, 1956 |
| 2,825,891 | Duinker | Mar. 4, 1958 |
| 2,851,678 | Crane | Sept. 9, 1958 |
| 2,856,596 | Miller | Oct. 14, 1958 |
| 2,910,674 | Wittenberg | Oct. 27, 1959 |
| 2,910,675 | Gessner | Oct. 27, 1959 |
| 2,914,754 | Ganzhorn et al. | Nov. 24, 1959 |